May 29, 1956 C. W. SAYE 2,747,622
CARCASS SAW WITH WASTE-DIVERTING SHIELD
Filed Oct. 26, 1953 2 Sheets-Sheet 1
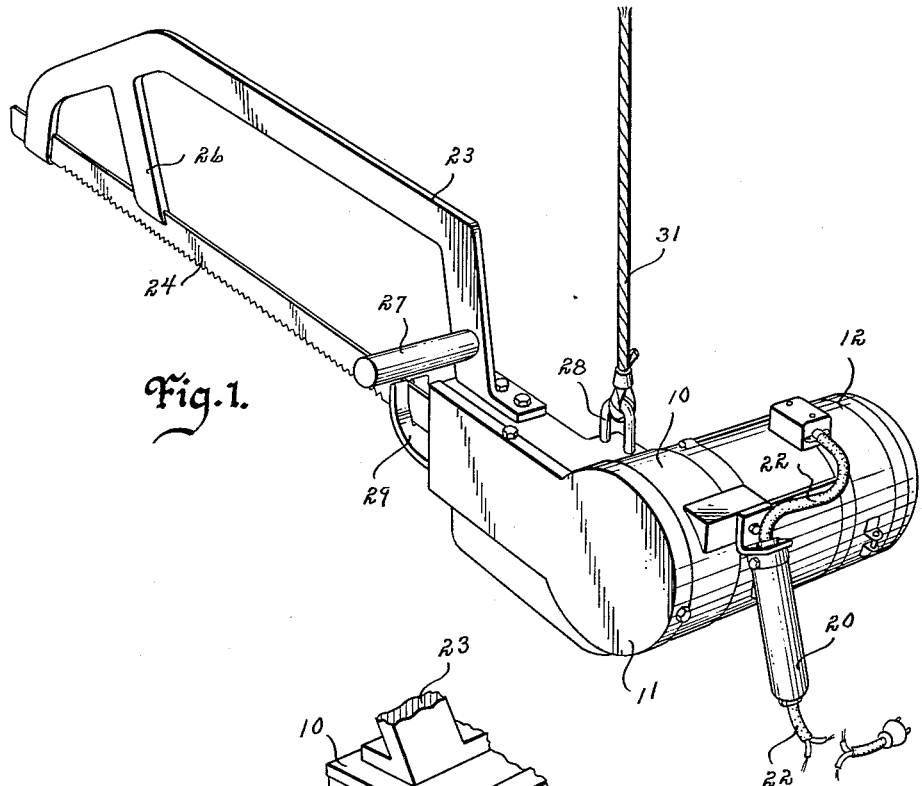
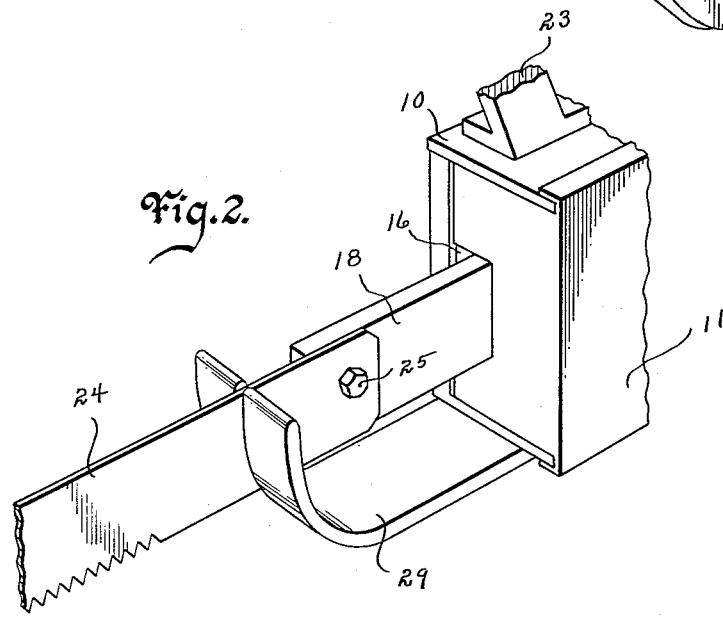
Inventor
Charles Walter Saye
by Talbert Dick & Adler
Attorneys
Witness
Edward P. Seeley

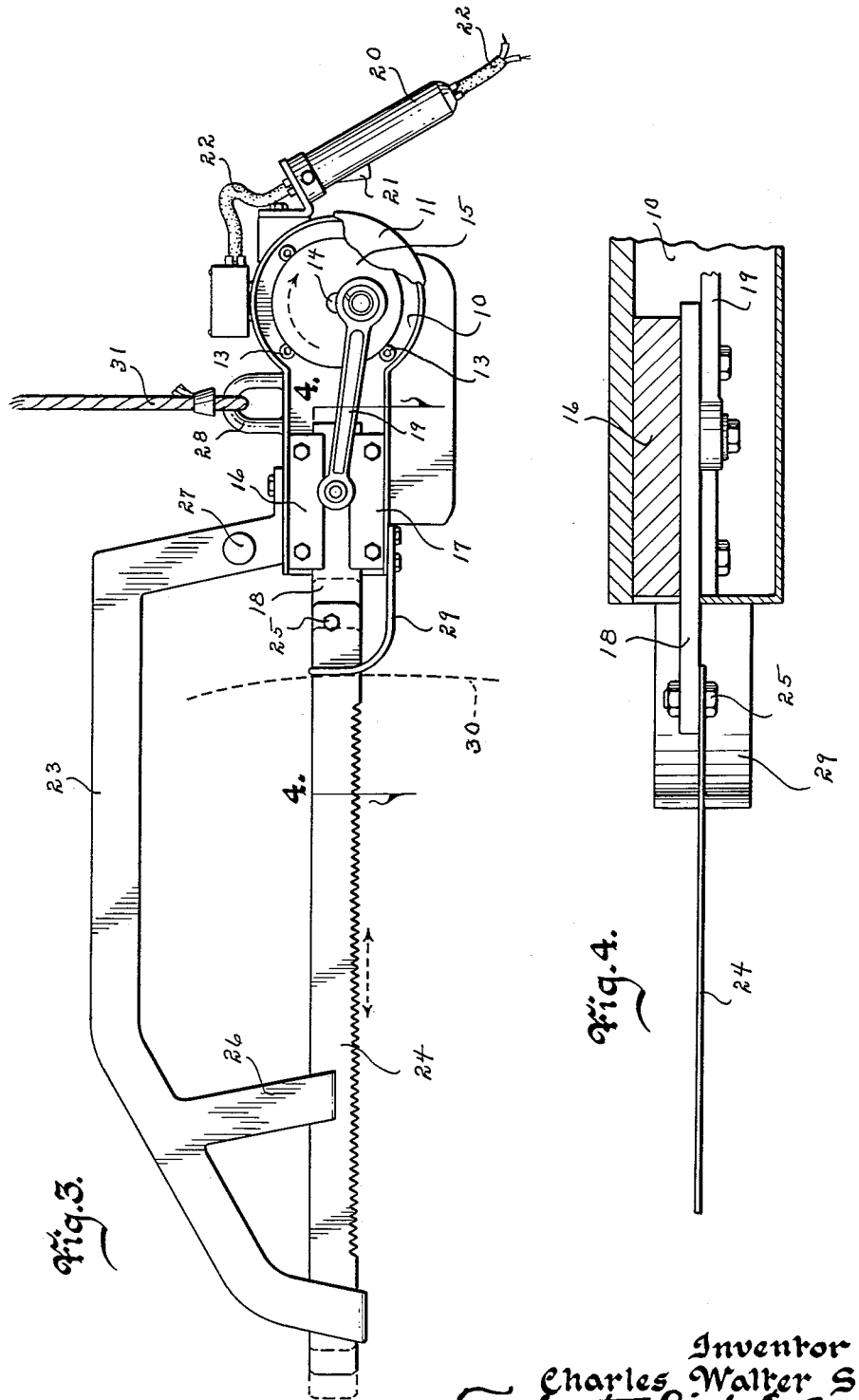

United States Patent Office 2,747,622
Patented May 29, 1956

2,747,622

CARCASS SAW WITH WASTE-DIVERTING SHIELD

Charles Walter Saye, Northboro, Iowa

Application October 26, 1953, Serial No. 388,252

2 Claims. (Cl. 143—68)

This invention relates to carcass splitting devices and more particularly to motorized meat, bone and the like saws.

Carcass saws are used in most all meat processing plants. They are relatively heavy, being supported by rope or like cable usually counterbalanced. Due to their unwieldy nature, their operation is little more than the manual guiding of the saw through that part of the animal carcass to be severed. They, however, have several objections. First, the meat and bone sawings are thrown by the reciprocating saw into the mechanical power means. Secondly, they produce excessive vibrations. Furthermore, they are cumbersome and difficult to keep in sanitary condition.

Therefore, the principal object of my invention is to provide a motorized carcass splitting saw that has a saw guide and guard that diverts all foreign matter from passing into the power mechanism.

A still further object of this invention is to provide a carcass saw that has very little objectionable vibration, and is compact and of smooth appearance.

Still further objects of my invention are to provide a carcass saw that is economical in manufacture and durable in use.

These and other objects will be apparent to those skilled in the art.

My invention consists in the construction, arrangement, and combination of the various parts of the device, whereby the objects contemplated are attained as hereinafter more fully set forth, specifically pointed out in my claims, and illustrated in the accompanying drawings, in which:

Fig. 1 is a perspective view of my saw in supported condition,

Fig. 2 is an enlarged perspective view of the forward housing end portion,

Fig. 3 is an enlarged side view of the device with parts removed to more fully illustrate its construction, and Fig. 4 is an enlarged longitudinal section view taken on line 4—4 of Fig. 3.

In these drawings I have used the numeral 10 to generally designate the base housing having its lift side and front open as shown in Fig. 3. This base housing is of greater area at its rear portion (which is circular) than that of its forward portion (which is rectangular). The numeral 11 designates its detachable cover which encloses the entire left side and most of its front end. The numeral 12 designates an ordinary electric motor secured on the rear right side of the housing 10 by bolts or like 13. The shaft 14 of the motor extends into the housing and transverse of its length. On the shaft 14 and inside the circular portion of the housing 10 is a fly wheel 15. In the forward end of the housing are the two spaced apart bearings 16 and 17. The numeral 18 designates a bar slidably mounted in the bearings 16 and 17 and extending through an opening in the forward end of the housing consisting of the parts 10 and 11. The numeral 19 designates a crank arm link pivoted at one end to the bar 18 and its other end pivoted to the fly wheel 15 at a point at one side of its center. Obviously when the electric motor is operating the bar 18 will be reciprocated. A handle 20 is secured to the rear portion of the device. This handle extends downwardly and rearwardly and may have a switch 21 imposed in the electric circuit 22 extending to the electric motor. The numeral 23 designates a saw frame secured to the forward top of the housing 10. This frame extends forwardly as shown in Fig. 1, and its free end acts as a bearing and support for the free end portion of the reciprocating saw blade 24. The rear end of this blade 24 may be detachably secured to the forward end of bar 18, by any suitable means such as the bolt 25. The numeral 26 designates a downwardly extending post on the frame and which has its end split, to embrace the back of the saw blade, thereby strengthening the unit. The numeral 27 designates a horizontal handle extending from the left side of the rear portion of the frame 23. The numeral 28 designates a link secured on the top of the housing for securing the supporting rope or cable 31. One of the important features of my device is the shield bracket 29 secured to the forward under side of the housing 10. This bracket extends forwardly and then curves upwardly toward the saw blade. The free end portion of this bracket is split to extend at each side of the saw blade, thus guiding, supporting and stabilizing the saw blade during its reciprocation. By extending closely at each side of the saw blade, the blade is held against lateral twisting action during the carcass cutting. This shield guard, however, performs several additional functions. By curving upwardly it may engage the carcass 30 as the saw travels downwardly. By thus slidably engaging the carcass, the carcass will be prevented from undesirable reciprocation with the saw blade. Also, the operator may easily see the sawing procedure and act accordingly by using the member 29 as a guide or sight. The member 29 also prevents the housing and motor part from coming into contact with the carcass being cut. Of utmost importance the member 29 acts as a saw cleaner and baffle to prevent pieces of meat, bone and other foreign matter from passing rearwardly from the sawing area into the housing 10 and into the mechanism therein.

In use my saw means is relatively light of weight and by the two handle members extending in vertical and horizontal planes, respectively, it is easily manipulated. While it is most efficient in use and is capable of handling the largest carcasses with despatch, its manufacture is most economical. For this reason it is an ideal tool for use by both small and large frozen food centers.

It is easily kept in a sanitary condition due to the wide bearing guard shield 29 straddling the blade from the underside, thereby catching all the bone and meat cuttings. Only this member 29 and the saw unit need be cleaned.

Some changes may be made in the construction and arrangement of my carcass saw with waste-diverting shield without departing from the real spirit and purpose of my invention, and it is my intention to cover by my claims, any modified forms of structure or use of mechanical equivalents which may be reasonably included within their scope.

I claim:

1. In a carcass saw, a housing, a frame extending forwardly from said housing, a bar member slidably mounted in the forward end portion of said housing, a power means for reciprocating said bar, a saw blade having its teeth extending downwardly and being reciprocatably supported by said frame; said saw blade detachably connected to said bar member, and a wide guard shield member extending from said housing in a horizontal plane below the teeth of said saw blade, thence upwardly in a curved path and having its free end portion split and extending upwardly at each side of the rear portion of said saw blade to a plane above the plane of said blade.

2. In a device of the class described, a housing, an electric motor secured to one side of said housing and having its drive shaft extending into said housing, a fly wheel on said drive shaft and inside said housing, a bar reciprocatably mounted in said housing and extending through the forward end of said housing, a shaft connecting said fly wheel to said bar, a downwardly extending handle on said housing, a saw supporting frame on said housing and extending forward thereof, a horizontal handle on said saw supporting frame, a saw blade slidably mounted to said frame and having its rear end secured to said bar, and a guard shield secured to the lower portion of said housing and below said saw blade, extending first horizontally and then curved to extend upwardly, and having its free end split to extend at each side of said saw blade, to a plane above the plane of said blade at a point forward of said bar.

References Cited in the file of this patent

UNITED STATES PATENTS

| | | |
|---|---|---|
| 1,542,127 | Hastings | June 16, 1925 |
| 1,617,410 | Meyer | Feb. 15, 1927 |
| 1,643,721 | Meyer | Sept. 27, 1927 |
| 2,143,981 | Harding | Jan. 17, 1939 |
| 2,337,769 | Redenbo | Dec. 28, 1943 |
| 2,436,692 | Greene | Feb. 24, 1948 |
| 2,548,411 | Vache | Apr. 10, 1951 |
| 2,596,481 | Hinks | May 13, 1952 |
| 2,637,354 | Davis | May 5, 1953 |

FOREIGN PATENTS

| | | |
|---|---|---|
| 233,251 | Great Britain | May 7, 1925 |